Sept. 26, 1950      L. LEWIS      2,523,578
TUBE COUPLING
Filed March 21, 1946
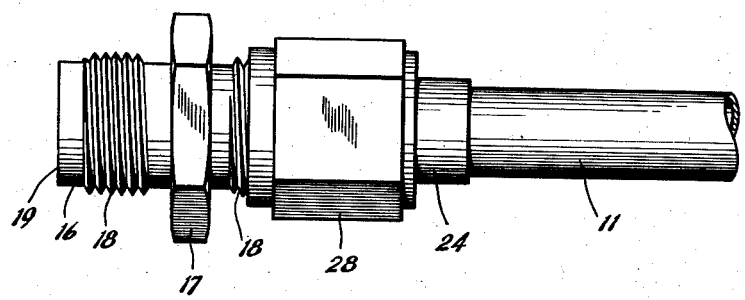
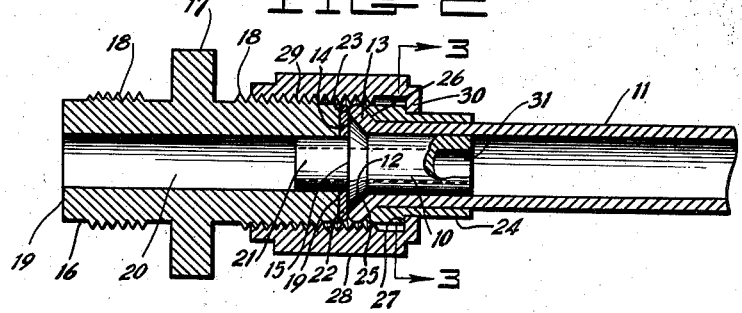
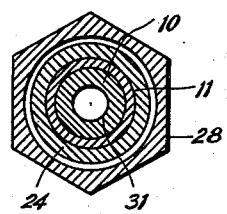
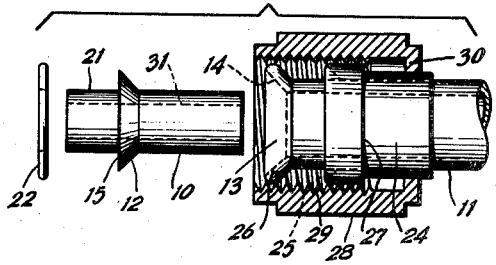
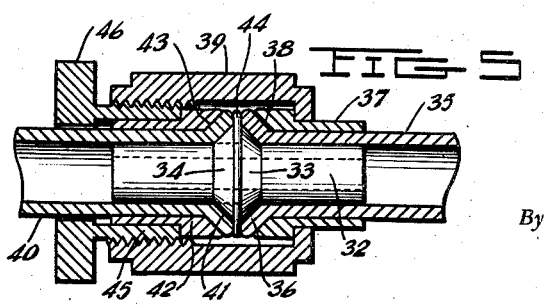
Inventor
*Lloyd Lewis*
By *Clarence A. O'Brien and Harvey B. Jacobson*
Attorneys Patented Sept. 26, 1950

2,523,578

UNITED STATES PATENT OFFICE 2,523,578

TUBE COUPLING

Lloyd Lewis, Indianola, Ill.

Application March 21, 1946, Serial No. 655,954

1 Claim. (Cl. 285—86)

This invention relates to new and useful improvements and structural refinements in tube couplings and the principal object of the invention is to provide a device of the character herein described which is particularly adapted for connecting high pressure hydraulic tubes and air lines in a firm and a secure manner to prevent any possibility of leakage.

A further object of the invention is to provide a tube coupling whereby a connection may be made without the use of conventional sealing compounds, such as may intermix with the fluid being conveyed therethrough and affect the chemical composition of the same. This advantage of the invention is clearly exemplified in the oxygen feed system of airplanes and the like, where the sealing compound, if employed in the couplings, may mix with the oxygen and produce an explosive mixture.

Another object of the invention is to provide a tube coupling which may be easily and conveniently connected or disconnected and in which such repeated connection does not impair the efficiency thereof.

An additional object of the invention is to provide a tube coupling which is of simple construction and which readily lends itself to economical manufacture.

A still further object of the invention is to provide a tube coupling which may be universally employed whenever a plurality of tubes are joined together, or where one tube is connected to any type of a fitting.

With the above more important objects in view, and such other objects as may become apparent as this specification proceeds, the invention consists essentially of the arrangement and construction of parts as illustrated in the accompanying drawings, in which:

Figure 1 is a side elevation of the invention.

Figure 2 is a central, cross-sectional view thereof.

Figure 3 is a cross-sectional view, taken in the plane of the line 3—3 in Figure 2.

Figure 4 is a partially exploded view, illustrating the manner in which the coupling is assembled, and Figure 5 is a central, cross-sectional view, showing a modified embodiment of the invention.

Like characters of reference are used to designate like parts in the specification and throughout the several views.

Referring now to the accompanying drawings in detail, the invention consists of a tubular insert or sleeve 10, pressed into and partially protruding from one end of the tube 11 which is to be connected. The insert 10 is provided, intermediate its ends, with a beveled shoulder or skirt 12, and the end of the tube 11 is flared as indicated by the reference character 13 so that the inner surface 14 thereof is complementary to and engages the aforementioned shoulder 12. It will be noted, that the flat surface 15 of the shoulder and the edge of the flared portion 13 are flush, as is best illustrated in the accompanying Figure 2.

A coupling union, designated by the general reference numeral 16, is formed with a nut 17, positioned between the externally threaded portions 18. This union is also provided with the flat end surfaces 19 and with an axial bore 20, in which is receivable the protruding end 21 of the insert 10. A gasket 22 is positioned on the insert between the shoulder 12 and the flat end 19 of the union 17, and it will be observed that the gasket covers the junction 23 between the shoulder 12 and the flared portion 13 of the tube 11.

A cylindrical pressure sleeve 24 is positioned on the end of the tube 11, one end of the sleeve being formed with a bevelled portion 25 which engages the outside surface 26 of the flared portion 13.

The sleeve 24 is also provided intermediate its ends with an annular step 27, the purpose of which is hereinafter more fully referred to.

A union nut 28 engages with its threaded portion 29 the externally threaded portion 18 of the coupling union 17 and the nut is also provided at the end thereof with an annular flange 30. This flange bears against the aforementioned step 27 of the sleeve 24 and retains the various components of the coupling together.

Having thus described the constructional details of the invention, its method of operation will now be presented.

As the nut 28 is tightened on the screw threaded portion 18 of the union 17, the flange 30, as already stated, will bear against the step 27 thus urging the sleeve 24, the flared portion 13 of the tube 11, and the shoulder 12 of the insert 10 against the gasket 22 and the flat end 19 of the union 17. The gasket thus forms an effective seal and a leak-proof connection of the tube 11 to the coupling union 17 is obtained.

The advantages of the invention as compared to the conventional, so-called "solderless" couplings will be clearly apparent since the sealing qualities of the gasket 22 are greatly superior to the seal obtained between contacting metallic surfaces which such conventional couplings employ. Furthermore, in the invention the fluid passes through the bore 31 of the insert 10, whereby the pressure of such fluid is sustained by the continuous wall of the insert and is diverted from contacting surfaces whereat the possibility of leakage might occur. It should be understood in this connection, that the diameter of the bore 31 should be made as large as possible without impairing the strength of the insert 10, in order that the flow of fluid through the insert will not be excessively obstructed.

Further advantages of the invention are that the insert 10, more particularly, the protruding end 21 thereof will serve as effective means for aligning the tube 11 with the coupling union 17 when the connection is being made. The danger of mutilating the flared end of the tube by repeated connections or over-tightening of the union nut in the conventional solderless couplings is eliminated in the invention. Herein, the flange 30 transmits a direct pressure in parallel with the axis of the tube 11, which pressure is carried through the contacting surfaces 26 and 14 against the flat end surface 19. The coupling may thus be connected and disconnected repeatedly without damaging the flared portion 13, it only being necessary to replace the gasket 22 when the same shows signs of mutilation or wear.

It should be understood that when two tubes are connected together, the remaining of the tubes (not shown) is joined to the remaining half of the coupling union 17 in a manner identical to that described and illustrated in connection with the tube 11. Alternatively, the coupling union 17 may assume the form of a flange, an elbow, a Y coupling, a T coupling, or of any other fitting to which the tube 11 is to be connected.

Referring to the modified embodiment of the invention illustrated in the accompanying Figure 5, the insert 32 is provided with the bevelled shoulder 33, these being similar to the aforementioned components 10 and 12 respectively. However, a further bevelled shoulder 34 is also positioned on the insert 32 and while the shoulder 33 is rigidly secured to the insert, the shoulder 34 is freely positioned thereon, so that it is free to slide and rotate on the insert.

One end of the insert 32 is pressed into the tube 35 and the end of the latter is flared as at 36 to engage the shoulder 33. The pressure sleeve 37 is similar to the aforementioned sleeve 24, the bevelled portion 38 of the sleeve 37 engaging the flare 36 of the tube 35.

The sleeve 37 is retained in position by the union nut 39, the same corresponding to the aforementioned nut 28.

The remaining end of the insert 32 may be pressed into a further tube 40, the latter being flared at the end thereof as at 41, to engage the shoulder 34. A further pressure sleeve 42 is positioned on the outside of the tube 40, the sleeve 42 having a bevelled portion 43, co-acting with the flare 41. It will be noted that the modified embodiment, generally speaking, is more or less a two-sided duplication of the primary embodiment of the invention, already described.

A gasket 44 is positioned between the shoulders 33 and 34 and as the union nut 39 is tightened upon the threaded portion 45 of a suitable coupling union 46, the pressure sleeves 37 and 42 will, of course, be drawn together. Simultaneously, the flares 36 and 41 and the shoulders 33 and 34 will be pressed against the gasket 44 and the sealing characteristics of the coupling thus formed become clearly apparent.

It will be appreciated that by virtue of the seating action resulting from the use of the bevelled shoulders (33, 34) and the pressure sleeves (37, 42) on both sides of the gasket 44, the leakproof nature of the coupling shown in the modified embodiment will be superior to that of the embodiment shown in Figures 1 to 4. Consequently, the modified embodiment may be effectively employed for use in the transmission of fluids at relatively higher pressures.

While in the foregoing there has been shown and described the preferred embodiment of this invention it is to be understood that minor changes in the details of construction, combination and arrangement of parts may be resorted to without departing from the spirit and scope of the invention claimed.

What I claim as my invention is:

In combination with a tube having a frustoconical flare at an end thereof, and a substantially tubular union member provided with an externally screw-threaded end portion and with a flat end surface, a coupling device for connecting said tube to said union member, said coupling device comprising a tubular sleeve, a frusto-conical skirt provided intermediate the ends of said sleeve and affording a tapered surface and a flat surface perpendicular to the longitudinal axis of said sleeve, one end portion of said sleeve being inserted in said union member, the remaining end portion of the sleeve being disposed in the flared end portion of said tube, the tapered surface of said skirt abutting the inner surface of said flare and the outer end edge of the flare being disposed substantially in the plane of the flat surface of said skirt, an annular gasket positioned on said sleeve between the flat surfaces of said skirt and of said union member, said gasket covering the abutment of the tapered surface of said skirt and the inner surface of said flare, and means coacting with the outer surface of said flare and with the screw-threaded portion of said union member for compressing said gasket between the flat end surface of said member on one side and the flat surface of said skirt and the outer end edge of said flare on the other.

LLOYD LEWIS.

REFERENCES CITED

The following references are of record in the file of this patent:

UNITED STATES PATENTS

| Number | Name | Date |
|---|---|---|
| 2,122,616 | Lamont | July 5, 1938 |
| 2,341,629 | Kreidel | Feb. 15, 1944 |